(12) United States Patent  (10) Patent No.: US 8,086,800 B2
Radulescu et al.  (45) Date of Patent: Dec. 27, 2011

(54) INTEGRATED CIRCUIT AND METHOD FOR BUFFERING TO OPTIMIZE BURST LENGTH IN NETWORKS ON CHIPS

(75) Inventors: Andrei Radulescu, Eindhoven (NL); Kees Gerard Willem Goossens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 632 days.

(21) Appl. No.: 11/569,083

(22) PCT Filed: May 13, 2005

(86) PCT No.: PCT/IB2005/051580
§ 371 (c)(1), (2), (4) Date: Nov. 14, 2006

(87) PCT Pub. No.: WO2005/111823
PCT Pub. Date: Nov. 24, 2005

(65) Prior Publication Data
US 2007/0226407 A1  Sep. 27, 2007

(30) Foreign Application Priority Data
May 18, 2004 (EP) .................................. 04102189

(51) Int. Cl.
*G06F 12/00* (2006.01)
*G06F 13/00* (2006.01)
*G06F 13/28* (2006.01)
*G06F 3/00* (2006.01)
*G06F 5/00* (2006.01)

(52) U.S. Cl. ........... 711/118; 711/141; 710/57; 710/100

(58) Field of Classification Search ........................ None
See application file for complete search history.

(56) References Cited

U.S. PATENT DOCUMENTS

| 4,228,496 | A | * | 10/1980 | Katzman et al. | 710/100 |
| 4,253,144 | A | * | 2/1981 | Bellamy et al. | 709/226 |
| 4,378,588 | A | * | 3/1983 | Katzman et al. | 710/57 |
| 5,987,552 | A | | 11/1999 | Chittor et al. | |
| 6,393,500 | B1 | | 5/2002 | Thekkath | |
| 6,397,287 | B1 | | 5/2002 | Brown et al. | |

(Continued)

FOREIGN PATENT DOCUMENTS

JP  7123118 A  5/1995
(Continued)

OTHER PUBLICATIONS

ARM, "AMBA AXI Protocol V1.0 Specification" XP002342105, pp. 1011, Aug. 24, 2005.

*Primary Examiner* — Michael Alsip

(57) ABSTRACT

An integrated circuit includes a plurality of processing modules coupled by a network. A first processing module communicates with a second processing module based on transactions. A first wrapper means associated to the second processing module buffers data from the second processing module to be transferred over the network until a first amount of data is buffered and then transfers the first amount of buffered data to the first processing module.

21 Claims, 2 Drawing Sheets

U.S. PATENT DOCUMENTS

| | | |
|---|---|---|
| 6,493,776 B1 | 12/2002 | Courtright et al. |
| 6,629,253 B1 | 9/2003 | Witter et al. |
| 6,668,308 B2 * | 12/2003 | Barroso et al. ............... 711/141 |
| 7,257,665 B2 * | 8/2007 | Niell et al. ................... 711/101 |
| 7,549,024 B2 * | 6/2009 | Piry et al. ..................... 711/141 |
| 7,769,893 B2 | 3/2010 | Goossens |
| 2002/0186660 A1 * | 12/2002 | Bahadiroglu ................ 370/248 |
| 2003/0101307 A1 | 5/2003 | Gemelli et al. |

FOREIGN PATENT DOCUMENTS

| | | |
|---|---|---|
| JP | 200209652 A | 7/2000 |
| JP | 2002084289 A | 3/2002 |
| WO | 2004034173 A2 | 4/2004 |
| WO | 2005026964 A2 | 3/2005 |

\* cited by examiner

INTEGRATED CIRCUIT AND METHOD FOR BUFFERING TO OPTIMIZE BURST LENGTH IN NETWORKS ON CHIPS

FIELD OF THE INVENTION

The invention relates to an integrated circuit having a plurality of processing modules and an interconnect means for coupling said plurality of processing, a method for buffering and a data processing system.

BACKGROUND OF THE INVENTION

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the systems modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus.

A communication network forms an effective way to overcome these disadvantages. Networks on chip (NoC) have received considerable attention recently as a solution to the interconnect problem in highly-complex chips. The reason is twofold. First, NoCs help resolve the electrical problems in new deep-submicron technologies, as they structure and manage global wires. At the same time they share wires, lowering their number and increasing their utilization. NoCs can also be energy efficient and reliable and are scalable compared to buses. Second, NoCs also decouple computation from communication, which is essential in managing the design of billion-transistor chips. NoCs achieve this decoupling because they are traditionally designed using protocol stacks, which provide well-defined interfaces separating communication service usage from service implementation.

Using networks for on-chip communication when designing systems on chip (SoC), however, raises a number of new issues that must be taken into account. This is because, in contrast to existing on-chip interconnects (e.g., buses, switches, or point-to-point wires), where the communicating modules are directly connected, in a NoC the modules communicate remotely via network nodes. As a result, interconnect arbitration changes from centralized to distributed, and issues like out-of order transactions, higher latencies, and end-to-end flow control must be handled either by the intellectual property blocks (IP) or by the network.

Most of these topics have been already the subject of research in the field of local and wide area networks (computer networks) and as an interconnect for parallel machine interconnect networks. Both are very much related to on-chip networks, and many of the results in those fields are also applicable on chip. However, NoC's premises are different from off-chip networks, and, therefore, most of the network design choices must be reevaluated. On-chip networks have different properties (e.g., tighter link synchronization) and constraints (e.g., higher memory cost) leading to different design choices, which ultimately affect the network services.

Introducing networks as on-chip interconnects radically changes the communication when compared to direct interconnects, such as buses or switches. This is because of the multi-hop nature of a network, where communication modules are not directly connected, but separated by one or more network nodes. This is in contrast with the prevalent existing interconnects (i.e., buses) where modules are directly connected.

Modern on-chip communication protocols (e.g., Device Transaction Level DTL and AXI-Protocol) operate on a split and pipelined basis with transactions consisting of a request and a response, and the bus is released for use by others after a request issued by a master is accepted by a corresponding slave. Split pipelined communication protocols are used especially in multi-hop interconnects (e.g., networks on chip, or buses with bridges), allowing an efficient utilization of the interconnect. The efficiently of a split bus can be increased for cases where a response generation at the slave is time consuming. On a pipelined protocol, a master is allowed to have multiple outstanding requests (i.e., requests for which the response is pending or expected).

The above-mentioned protocols are designed to operate at a device level, as opposed to a system or interconnect level. In other words they are designed to be independent of the actual interconnect implementation (e.g., arbitration signals are not visible) allowing the reuse of intellectual property blocks IP and their earlier integration.

In particular, the above-mentioned on-chip communication protocols comprise four main groups of signals, namely commands (or address), write data, read data and write response. The command group consists of command, addresses and command flags like burst length and mask. The command and write data groups are driven by the initiator to the target. The read data and write response are driven by the target to the initiator following a command from an initiator. All four groups are independent of each other with some ordering constraints between them, e.g. a response cannot be issued before a command.

These on-chip communication protocols also implement the concept of buffering data which is well-known in the art of chip design. Typically, buffering is used to decouple different modules, wherein one module produces data and the other consumes the data. Without buffering, the producing module would be blocked by the consuming module until it is ready to accept its data. In order to avoid the blocking of the producing module, a buffer may be introduced, storing the data produced by the producing module and thus allowing the producer to continue its execution even when the consuming module is not ready. When the consuming module is ready to accept some or all buffered data, the data stored in the buffer is immediately supplied to the consuming module.

On the other hand modern on-chip communication protocols also use the buffering of write commands or data in order to improve the interconnect utilization. Accordingly, small write bursts are stored or accumulated in a buffer before they are sent over an interconnect. Instead of being transferred in short burst, the accumulated data will be transported in a long burst over the interconnect, which usually leads to an improved interconnect utilization. This may be implemented by buffering first write data W1 (i.e. the data is not transferred over the interconnect) which is then not transferred until for example a second write data W2 arrives in the buffer, such that they are transferred as one burst with an optimal length with regards to the interconnect utilization.

Therefore, data from a number of writes can be buffered and aggregated in one burst. In addition, parts of the data in write commands may be sent in separate bursts.

The reason for the implementation of this buffering technique in the above-mentioned on-chip communication protocols is that the intellectual property blocks IP in a system on-chip connected by an interconnect should be able to communicate "naturally", i.e. the word width and the burst sizes are configured such that they rather suit the device than the interconnect. For example, if an intellectual property block IP processes pixels, then these intellectual property blocks consume and produce pixels, while in the case that they process video frames, they consume and produce video frames. By buffering the data, the data to be transmitted over the interconnect is forced to wait until a sufficient amount of data is gathered such that these data can be transferred at once in a burst.

The above-mentioned on-chip protocols have been designed mainly for buses with a small latency. In addition, these protocols have been designed based on the assumption that read operations are always urgent and should therefore be completed as soon as possible without unnecessary buffering. However, as systems grow larger and multi-hop interconnects like networks or buses with bridges, the latency grows as well. In these cases the communication granularity become coarser and the latency requirements become less strict.

In addition, these protocols comprise means to force some of the currently buffered data to be transferred although the optimal burst length has not been reached in order to prevent deadlock caused by buffering data indefinitely. The DTL communication protocol provides a flush signal forcing all data up to the current word to be transferred over the interconnect. The AXI protocol provide an unbuffered flag for write commands to force buffered data to be transferred.

It is therefore an object of the invention to provide an integrated circuit, a method for buffering as well as a data processing system with an improved interconnect utilization.

Therefore, an integrated circuit comprising a plurality of processing modules coupled by an interconnect means is provided. A first processing module communicates with a second processing module based on transactions. A first wrapper means associated to said second processing module buffers data from said second processing module to be transferred over said interconnect means until a first amount of data is buffered and then transfers said first amount of buffered data to said first processing module.

Accordingly, data is buffered on the slave side until a sufficient large amount of data to be transferred over the interconnect in a single package is reached. Reducing the number of packets sent over the interconnect reduces the overhead of the communication as less packet headers are required. The data to be sent is buffered until a sufficient amount of data is gathered.

According to an aspect of the invention, a second wrapper means is associated to the first processing module for buffering data from said first processing module to be transferred over the interconnect means to said second processing module until a second amount of data is buffered and said second wrapper means then transfers said buffered data to said second processing module. Therefore, data is buffered on the master as well as on the slave side until a sufficient large amount of data to be transferred over the interconnect in a single package is reached.

According to a further aspect of the invention said first and second wrapper means are adapted to transfer the buffered data in response to a first and second unbuffer signal, or a particular combination of a group of signals, respectively (even if less than the first and second amount of data is buffered in said first and second wrapper means). By issuing the unbuffer signals an occurrence of a deadlock due to a processing waiting for the buffered data can be avoided.

According to a further aspect of the invention said first and second wrapper means are adapted to transfer the buffered data according to a first and second unbuffer flag, respectively (even if less than the first and second amount of data is buffered in said first and second wrapper means). Therefore, an alternative approach to flush buffered data is provided. As opposed to the signal, which is given for each transaction, the flag may be set for a longer time. In this way, the buffering can be switched on or off. The flag can be set/unset in any way, e.g., with a signal from the IP as part of a transaction, or via separate configuration transactions (either special flush transactions or a memory-mapped reads and writes). These transactions can be issued either from the same IP, or from a separate configuration module.

According to a preferred aspect of the invention at least one of said first and second wrapper means comprise a determination unit BLDU for determining the optimal first or second amount of data to be buffered in said first or second wrapper means before said data is transferred according to the communication properties of said communication between said first and second processing module. Accordingly, the packet size of the data transferred over the interconnect can be adapted according to the properties of the actual communication and thereby the utilization of the interconnect can be improved.

The invention also relates to a method for buffering data in an integrated circuit having a plurality of processing modules being connected with an interconnect means, wherein a first processing module communicated to a second processing module based on transactions, comprising the step of buffering data from said second processing module to be transferred over the interconnect means until a first amount of data is buffered, wherein the buffered data are transferred when said first amount of data has been buffered.

The invention further relates to a data processing system comprising an integrated circuit comprising a plurality of processing modules coupled by an interconnect means is provided. A first processing module communicates with a second processing module based on transactions. A second wrapper means associated to said second processing module buffers data from said second processing module to be transferred over said interconnect means until a first amount of data is buffered and then transfers said first amount of buffered data to said first processing module.

Accordingly, the buffering of data as described above can also be applied in a system comprising a plurality of integrated circuits.

The invention is based on the idea to buffer data until the buffered data is sufficiently large to be transferred optimally over an interconnect means in a packet. The larger a packet is, the smaller is the amount of packet headers and therefore the overhead is reduced and the interconnect is utilized more efficiently. The data is only transferred when sufficient data for an optimal packet size has been buffered even when data can be sent earlier. The data is only transferred from the buffer when the conditions for an optimal transfer are satisfied.

Further aspects of the invention are described in the dependent claims.

These and other aspects of the invention are apparent from and will be elucidated with reference to the embodiment (s) described hereinafter.

DESCRIPTION OF THE PREFERRED EMBODIMENTS

The following embodiments relate to systems on chip, i.e. a plurality of modules on the same chip (including e.g. system in a package, multi-die modules) or on different chips, communicate with each other via some kind of interconnect. The interconnect is embodied as a network on chip NOC. The network on chip may include wires, bus, time-division multiplexing, switches, and/or routers within a network. At the transport layer of said network, the communication between the modules may be performed over connections. A connection is considered as a set of channels, each having a set of connection properties, between a first module and at least one second module. For a connection between a first module and a single second module, the connection may comprises two channels, namely one from the first module to the second channel, i.e. the request channel, and a second from the second to the first module, i.e. the response channel. The request channel is reserved for data and messages from the first to the second, while the response channel is reserved for data and messages from the second to the first module. However, if the connection involves one first and N second modules, 2*N channels are provided. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, priority, or data delivery.

Figure 1:
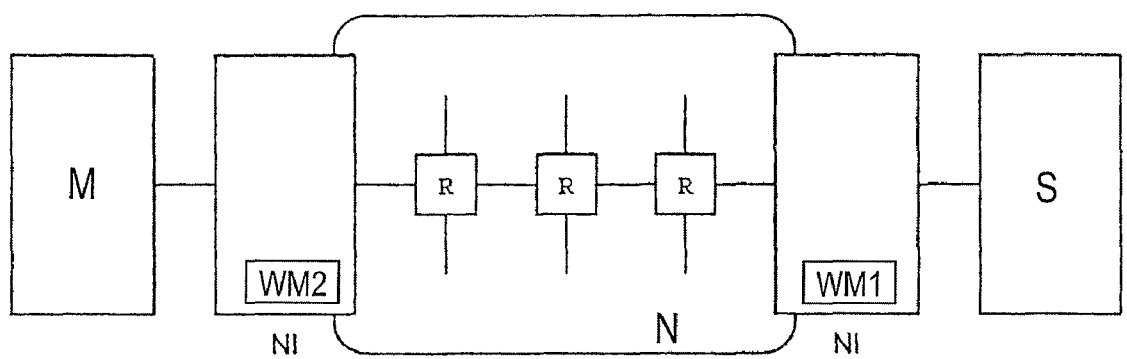
FIG. 1 shows a schematic representation of a network on chip according to the first embodiment.

FIG. 1 shows a basic arrangement of a network on chip according to the invention. In particular, a master module M and a slave module S each with an associated network interface NI are depicted. Each module M, S is connected to a network N via its associated network interface NI, respectively. The network interfaces NI are used as interfaces between the master and slave modules M, S and the network N. The network interfaces NI are provided to manage the communication between the respective modules M, S and the network N, so that the modules can perform their dedicated operation without having to deal with the communication with the network or other modules. The network N may comprise a plurality of network routers R for routing data through the network from one network interface NI to another.

The modules as described in the following can be so-called intellectual property blocks IPs (computation elements, memories or a subsystem which may internally contain interconnect modules) that interact with network at said network interfaces NI. A network interface NI can be connected to one or more IP blocks. Similarly, an IP block can be connected to more than one network interfaces NI.

The network interfaces associated to the master M and the slave S each comprise a wrapper means WM2, WM1, respectively. The wrapper means WM2, WM1, are responsible for buffering any data sent from the master M and the slave S over the network N. In particular, the two wrapper means WM1, WM2 buffer data coming from the master M or the slave S, respectively, until a certain amount of data is buffered. Thereafter, the buffered data is transferred over the network N, i.e. the interconnect, as a packet within a certain burst length. It should be noted that the wrapper means WM2, WM1 is associated to the master M as well as to the slave S allowing the request as well as the response data to be buffered and sent in respective burst lengths. As the response may differ from the request the burst lengths thereof may also differ. The selected burst length should be adopted to suit the network N in order to improve the network utilization.

Figure 2:
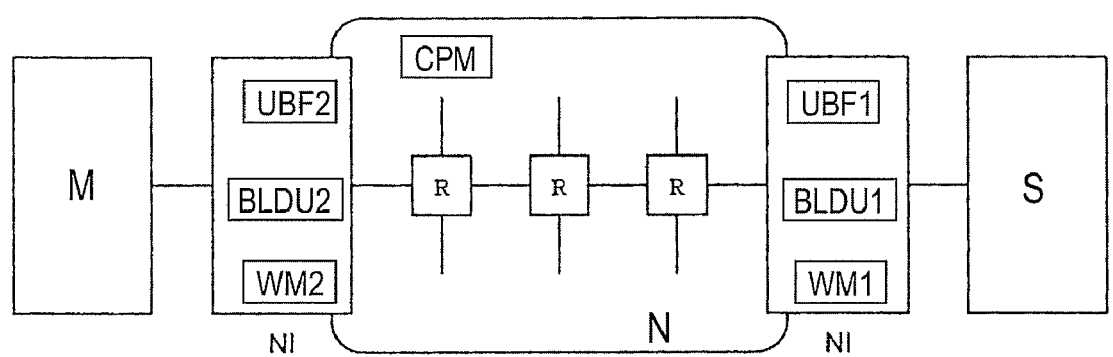
FIG. 2 shows a schematic representation of a network on chip according to a second embodiment.

FIG. 2 shows a schematic representation of a network on chip according to a second embodiment. In particular, the second embodiment substantially corresponds to the network on chip according to the first embodiment. Therefore, a first wrapper means WM1 is arranged in the network interface NI associated to the slave S and a second wrapper means WM2 is arranged in the network interface NI associated to the master M. As in the first embodiment, the wrapper means WM1, WM2 serve to buffer data to be sent over the network N until the conditions for an optimal transfer are satisfied. A first unbuffer-flag unit UBF1 and a second unbuffer-flag unit UBF2 are arranged in the network interface associated to the slave S and to the master M, respectively. The first and second unbuffer-flag units UBF1, UBF2 serve to store a first and second unbuffer flag. The first and second wrapper means WM1, WM2 are adapted to immediately transfer the buffered data when the first or second unbuffer-flag is set in the first or second unbuffer-flag unit UBF1, UBF2, respectively. By providing this possibility to flush the buffered data a deadlock caused by data being buffered can be prevented. In such case, all data being buffered are transferred as fast as possible without waiting for a packet size to suit the optimal burst length for the network N.

The flushing of the buffered data may also be achieved by a first or second unbuffer signal received by the first or second wrapper means WM1, WM2. Therefore, if the first or second wrapper means WM1, WM2 receives an unbuffer signal, the data currently buffered are transferred as fast as possible, i.e. without waiting for the optimal burst length to be acquired. Accordingly, the master M may initiate the flushing of requests and slave S initiates the flushing of responses.

As opposed to the unbuffer signals, which is given for each transaction, the unbuffer flag may be set for a longer time. In this way, the buffering can be switched on or off. The flag can be set/unset in any way, e.g., with a signal from the IP as part of a transaction, or via separate configuration transactions (either special flush transactions or a memory-mapped reads and writes). These transactions can be issued either from the same IP, or from a separate configuration module.

In addition, a first and second determination means BLDU1, BLDU2 are arranged in the network interfaces NI associated to the slave S and the master M, respectively. The first and second determination units BLDU1, BLDU2 serve to determine the optimal burst length for transferring data over the network N according to the current communication or connection properties. The determination of the optimal burst length can be performed statically or dynamically, during the initial phases of the required processing or during predetermined time intervals. Alternatively, the optimal burst length may be determined dynamically (1) every time a connection is set up for transferring data over the network, (2) for every transaction, (3) whenever an IP switches to another connection, (4) for every packet, (5) when the state of the network on chip changes (e.g., reconfiguration, NoC load, buffer fillings, etc.). The determination of the optimal burst length may be performed based on information stored in the determination units BDLU 1, 2 or on information received from the network N or IP blocks. Accordingly, the network N may comprise a communication property means CPM for determining and possibly storing the communication or connection properties for a requested communication or connection. The CPM can be centralized, or distributed (e.g., in every NI).

Besides the optimal burst length determination, also the transmission moment may be determined in a similar way by the first and second determination means BLDU1, BLDU2. For a guaranteed throughput GT connection, data should wait for one of the slots reserved for its connection. Using a "flush"-like signal/flag may force the sending of the data in advance. Alternatively, for a best effort BE connection, a round robin arbitration across connections in the NI can be used. A "flush"-like signal may force a temporarily higher priority for a connection.

In the first and second embodiment the data, i.e. the buffered data, is sent over the network in form of packets. The packets are preferably formed in the respective network interfaces NI and should be sufficiently large to be transferred in an optimal way with regard to the network N. As every packet comprises a packet header, the larger the packets, the smaller the number of required packet headers, which will consequently lead to a reduced overhead and an improved network utilization. The data is buffered until the buffered data reach an optimal packet size such that the buffered data can be transferred over the network. If the amount of buffered data has not yet reached the optimal packet size, none of the data is transferred over the network N even if transferring a smaller packet size is possible. The burst size is associated to a bus or to the IP view on communication, while the packet length is only applicable when packetization takes place (not necessary for a bus). All of the burst size determination schemes mentioned in the previous paragraph also apply to the optimal packet size determination.

Preferably, according to the first and second embodiment the data is buffered in the network interface NI, i.e. the interconnect interface, such that the master M or the slave S, which may constitute intellectual property blocks are not involved in the actual communication or the communication protocol for communicating over the interconnect or the network.

In other words, buffering is achieved for requests as well as for responses, i.e. requests as well as responses are accumulated in a buffer on the master and on the slave side, respectively, before being transferred over the interconnect. The requests and responses are aggregated in bursts with a length optimal for the particular interconnect. As in the case of a request like a write, the buffering can be prevented with an unbuffered flag to the response part of the transaction. Hence, all responses or requests pending and including the current one are transferred as fast as possible without being buffered to form an optimal burst length for the interconnect.

According to a further embodiment, the master initiates the flushing of requests as well as responses, independently and/ or at the same time. In such a case, the (AXI or DTL) command group should be extended to allow indication of the different kind of flushes (e.g., 2-bit flush signal in DTL). This indication for response flushing should be forwarded to the slave NI which will then act accordingly. The same applies when using flags.

According to a further embodiment the communication scheme of the network on chip is based on a message-passing communication scheme. Here, the message header of a message may contain a flush information, which will cause all the messages from the same connection that have been sent earlier to be flushed.

According to a further embodiment the communication scheme of the network on chip is a packet-based communication scheme, i.e. one message is sent in one or more packets, the flush information should be included in the packet header.

The above-mentioned scheme may be applied to transaction-based protocols like DTL and AXI. In particular, the scheme allows a wrapper to optimise the burst length for an interconnect not only for the request, but also for responses, within a transaction. Examples of requests are (acknowledged/unacknowledged) write command a plus data, read commands, or more complex commands such as test-and-set, semaphore commands (P, V). Examples of responses are read data, write acknowledgments, and return values from more complex commands. Intellectual property modules connected to the interconnect via the wrapper or interconnect interfaces can therefore be build independently of the interconnect, i.e. the reuse of these IP modules can be increased, as the knowledge of the interconnect characteristics lies only in the wrappers. As for the requests, this may introduce possible additional latency, however the overall system efficiency is increased.

In addition, by providing the wrapper means in the network interfaces associated to the master as well as to the slave, the network interfaces can be designed symmetrically which may also improve their reuse.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. An integrated circuit comprising:
   a plurality of processing modules being connected with an interconnect and each of the plurality of processing modules having a memory, wherein a first processing module communicates to a second processing module using transactions, wherein the first processing module is a master for providing requests and the second processing module is a slave for providing responses to the requests;
   a first interface unit coupled to the slave and including a first wrapper for buffering data from the slave to be transferred over the interconnect to the master, the first interface unit further including a first determination unit, wherein the first determination unit is configured to determine a first optimal amount of data to be buffered by the first wrapper, and wherein the buffered data are transferred when said first optimal amount of data has been buffered by the first wrapper, and wherein the first interface unit including the first wrapper and the first determination unit is connected between the slave and the interconnect; and
   a second interface unit coupled to the master and including a second wrapper for buffering data from the master to be transferred over the interconnect, the second interface unit further including a second determination unit, wherein second determination unit is configured to determine a second optimal amount of data to be buffered by the second wrapper, and wherein the buffered data are transferred when said second optimal amount of data has been buffered by the second wrapper, and wherein the second interface unit including the second wrapper and the second determination unit is connected between the master and the interconnect, wherein at least one of the first determination unit and the second determination unit is further configured to determine an optimal moment for sending the data in said first wrapper or said second wrapper according to communication properties of the communication between the master and the slave, wherein the communication properties include ordering of data transport, flow control including when a remote buffer is reserved for a connection, then a data producer will be allowed to send data only when it is guaranteed that space is available for the produced data at the remote buffer, throughput where a lower bound on throughput is guaranteed, latency where an upper bound for latency is guaranteed, lossiness including dropping of data, transmission termination, transaction completion, data correctness, priority, and data delivery.

2. The integrated circuit according to claim 1, wherein the first interface unit includes a first unbuffer-flag unit for providing a first unbuffer signal and the second interface unit includes a second unbuffer-flag unit for providing a second unbuffer signal, and wherein said first wrapper and said second wrapper are adapted to transfer the buffered data in response to the first unbuffer signal and the second unbuffer signal, respectively, even if less than said first optimal amount and said second optimal amount of data is buffered in said first wrapper and said second wrapper.

3. The integrated circuit according to claim 1, wherein the first interface unit includes a first unbuffer-flag unit for providing a first unbuffer flag and the second interface unit includes a second unbuffer-flag unit for providing a second unbuffer flag, and wherein said first wrapper and said second wrapper are adapted to transfer the buffered data according to the first unbuffer flag and the second unbuffer flag, respectively, even if less than said first amount and said second amount of data is buffered in said first wrapper and said second wrapper.

4. The integrated circuit according to claim 2, wherein said first unbuffer signal is initiated by the slave and said second unbuffer signal is initiated by the master.

5. The integrated circuit according to claim 3, wherein setting of said first unbuffer flag is initiated by the slave and setting of said second unbuffer flag is initiated by the master.

6. The integrated circuit according to claim 2, wherein the master is adapted to initiate said first unbuffer signal and said second unbuffer signal.

7. The integrated circuit according to claim 3, wherein the master is adapted to initiate setting of said first and second unbuffer flag.

8. The integrated circuit according to claim 1, wherein the master and the slave communicate with each other using messages of a message-passing communication scheme, wherein the messages contain a message header, and wherein said first wrapper and said second wrapper are adapted to transfer the buffered data in response to information in said message header, respectively, even if less than said first amount and said second amount of data is buffered in said first wrapper and said second wrapper.

9. The integrated circuit according to claim 1, wherein the master and the slave communicate with each other using packets of a packet based communication scheme, wherein the packets contain a packet header, and wherein said first wrapper and said second wrapper are adapted to transfer the buffered data in response to information in said packet header, respectively, even if less than said first amount and said second amount of data is buffered in said first and second wrapper.

10. A method for buffering data in an integrated circuit having a plurality of processing modules being connected with an interconnect through interface units, wherein a first processing module communicates to a second processing module using transactions, the method comprising the acts of:
configuring the first processing module having a first memory as a master the provides requests;
configuring the second processing module having a second memory as a slave the provides responses to the requests;
connecting the master to a master interface unit of the interface units;
connecting the master interface unit to the interconnect so that the master interface unit is between the master and the interconnect;
connecting the slave to a slave interface unit of the interface units;
connecting the slave interface unit to the interconnect so that the slave interface unit is between the slave and the interconnect;
determining by a master determination unit of the master interface unit a first optimal amount of data to be buffered by a master wrapper of the master interface unit;
determining by a slave determination unit of the slave interface unit a second optimal amount of data to be buffered by a slave wrapper of the slave interface unit;
buffering by the slave wrapper of the slave interface unit data from the slave to be transferred over the interconnect until a first optimal amount of data is buffered;
transferring the buffered data from the slave wrapper to the master wrapper when said first optimal amount of data has been buffered by the slave wrapper;
buffering by the master wrapper of the master interface unit data from the master to be transferred over the interconnect until a second optimal amount of data is buffered by the master wrapper;
transferring the buffered data from the master wrapper to the slave wrapper when said second optimal amount of data has been buffered by the master wrapper,
wherein at least one of the first determination unit and the second determination unit is further configured to determine an optimal moment for sending the data in said first wrapper or said second wrapper according to communication properties of the communication between the master and the slave, wherein the communication properties include ordering of data transport, flow control including when a remote buffer is reserved for a connection, then a data producer will be allowed to send data only when it is guaranteed that space is available for the produced data at the remote buffer, throughput where a lower bound on throughput is guaranteed, latency where an upper bound for latency is guaranteed, lossiness including dropping of data, transmission termination, transaction completion, data correctness, priority, and data delivery.

11. A data processing system, comprising:
a plurality of processing modules each having a memory and being connected with an interconnect, wherein a first processing module communicates to a second processing module using transactions, wherein the first processing module is a master for providing requests and the second processing module is a slave for providing responses to the requests; and a first interface unit coupled to the slave and including a first wrapper for buffering data from the slave to be transferred over the interconnect, the first interface unit further including a first determination unit, wherein the first determination unit is configured to determine a first optimal amount of data to be buffered by the first wrapper, and wherein the buffered data are transferred when said first optimal amount of data has been buffered by the first wrapper, and wherein the first interface unit including the first wrapper and the first determination unit is connected between the slave and the interconnect; and a second interface unit coupled to the master and including a second wrapper for buffering data from the master to be transferred over the interconnect, the second interface unit further including a second determination unit, wherein second first determination unit is configured to determine a second optimal amount of data to be buffered by the second wrapper, and wherein the buffered data are transferred when said second optimal amount of data has been buffered by the second wrapper, and wherein the second interface unit including the second wrapper and the second determination unit is connected between the master and the interconnect, wherein at least one of the first determination unit and the second determination unit is further configured to determine an optimal moment for sending the data in said first wrapper or said second wrapper according to communication properties of the communication between the master and the slave, wherein the communication properties include ordering of data transport, flow control including when a remote buffer is reserved for a connection, then a data producer will be allowed to send data only when it is guaranteed that space is available for the produced data at the remote buffer, throughput where a lower bound on throughput is guaranteed, latency where an upper bound for latency is guaranteed, lossiness including dropping of data, transmission termination, transaction completion, data correctness, priority, and data delivery.

12. An integrated circuit comprising:

a plurality of processing modules including a first processing module having a first processing memory and a second processing module having a second processing memory;

a plurality of interconnect modules including a first interconnect module and a second interconnect module, wherein the first processing module is connected to the first interconnect module and the second processing module is connected to the second interconnect module; and a network for connecting the first interconnect module to the second interconnect module in order to provide a communication connection between the first processing module and the second processing module, wherein the first interconnect module is connected between the first processing module and the network, and wherein the second interconnect module is connected between the second processing module and the network;

wherein the first interconnect module includes a first memory for buffering first data from the first processing module, the first interconnect module further including a first determination unit, wherein the first determination unit is configured to determine a first optimal amount of data to be buffered by the first memory, and the second interconnect module includes a second memory for buffering second data from the second processing module, the second interconnect module further including a second determination unit, wherein the second determination unit is configured to determine a second optimal amount of data to be buffered by the second memory, the first interconnect module transferring the first data to the second processing module when the first data buffered in the first memory reaches the first optimal amount, and the second interconnect module transferring the second data to the first processing module when the second data buffered in the second memory reaches the second optimal amount wherein at least one of the first determination unit and the second determination unit is further configured to determine an optimal moment for sending the data in said first wrapper or said second wrapper according to communication properties of the communication between the master and the slave, wherein the communication properties include ordering of data transport, flow control including when a remote buffer is reserved for a connection, then a data producer will be allowed to send data only when it is guaranteed that space is available for the produced data at the remote buffer, throughput where a lower bound on throughput is guaranteed, latency where an upper bound for latency is guaranteed, lossiness including dropping of data, transmission termination, transaction completion, data correctness, priority, and data delivery.

13. The integrated circuit of claim 12, wherein the plurality of interconnect modules manages the communication connection freeing the plurality of processing modules to perform data processing.

14. The integrated circuit of claim 12, wherein the first interconnect module transfers the first data over the network as a first packet having a first burst length, and the second interconnect module transfers the second data over the network as a second packet having a second burst length; and wherein the first interconnect module has a first determination unit that determines the first burst length and the second interconnect module has a second determination unit that determines the second burst length in accordance with properties of selected buses of the network that provide the communication connection.

15. The integrated circuit of claim 14, wherein the first burst length differs from the second burst length.

16. The integrated circuit of claim 14, wherein the network comprises a communication property device that determines the properties of the network for a requested communication and provides the properties to the first determination unit and the second determination unit for determining the first burst length and the second burst length.

17. The integrated circuit of claim 14, wherein the first interconnect module comprises a first communication property device that determines the properties of the network for a requested communication for selection of the first burst length by the first determination unit, and the second interconnect module comprises a second communication property device that determines the properties of the network for the requested communication for selection of the second burst length by the second determination unit.

18. The integrated circuit of claim 12, wherein the first processing module provides a first flushing command to flush the first memory and a second flushing command to flush the second memory so that the first data and the second data are sent without waiting to reach the first amount and the second amount.

19. The integrated circuit of claim 18, wherein the first processing module provides the first flushing command and the second flushing command at least one of independently and simultaneously.

20. The integrated circuit of claim 18, wherein the second flushing command includes an indication to flush the second memory so that the first interconnect module forwards the second flushing command to the second interconnect module for flushing the second data from the second memory.

21. The integrated circuit of claim 12, wherein the first processing module includes flush information in a header of a message to cause all messages from a same connection that have been sent earlier to be flushed from at least one of the first memory and the second memory.

* * * * *